US011099639B1

(12) United States Patent
Byagowi

(10) Patent No.: US 11,099,639 B1
(45) Date of Patent: Aug. 24, 2021

(54) SYSTEMS AND METHODS FOR EYE TRACKING IN HEAD-MOUNTED DISPLAY DEVICES

(71) Applicant: Facebook Technologies, LLC, Menlo Park, CA (US)

(72) Inventor: Ahmad Byagowi, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 54 days.

(21) Appl. No.: 16/180,040

(22) Filed: Nov. 5, 2018

(51) Int. Cl.
G06F 3/01 (2006.01)
G02B 27/01 (2006.01)
G02B 27/00 (2006.01)

(52) U.S. Cl.
CPC ......... G06F 3/013 (2013.01); G02B 27/0093 (2013.01); G02B 27/0172 (2013.01); G02B 27/0179 (2013.01); G02B 2027/0187 (2013.01)

(58) Field of Classification Search
CPC .. G06F 3/013; G02B 27/0172; G02B 27/0093
See application file for complete search history.

(56) References Cited

U.S. PATENT DOCUMENTS

| 5,712,732 A * | 1/1998 | Street ............... H04N 13/31 359/630 |
| 6,992,565 B1 | 1/2006 | Giesler |
| 9,449,446 B1 | 9/2016 | Mullin et al. |
| 2011/0080339 A1 | 4/2011 | Sun et al. |
| 2012/0088446 A1 | 4/2012 | Fyke et al. |
| 2015/0145805 A1 | 5/2015 | Liu |
| 2015/0257647 A1 | 9/2015 | Buck et al. |
| 2015/0379255 A1 | 12/2015 | Konanur et al. |
| 2016/0091720 A1* | 3/2016 | Stafford ............. G02B 27/0093 345/8 |
| 2016/0213324 A1 | 7/2016 | Gil et al. |
| 2016/0366266 A1 | 12/2016 | Chung et al. |

(Continued)

FOREIGN PATENT DOCUMENTS

WO 2015/193460 A1 12/2015

OTHER PUBLICATIONS

"Walabot Sensor | Developer Programmable 3D Imaging RF Sensor for Makers," accessed at https://walabot.com/makers, accessed on Nov. 23, 2018, 9 pages.

(Continued)

Primary Examiner — Kent W Chang
Assistant Examiner — Scott D Au
(74) Attorney, Agent, or Firm — FisherBroyles, LLP

(57) ABSTRACT

The disclosed computer-implemented method may include transmitting a first signal by a first antenna element included in a head mounted display system, analyzing the second signal to determine multidimensional data for the second signal, comparing the multidimensional data for the second signal to known multidimensional data related to positions of a gaze of an eye of a user in the head mounted display system, identifying a position of a gaze for an eye of a user in the head mounted display system based on the comparison, and adjusting image data for display on a display device included in the head mounted display system based on the identified position of the gaze of the eye of the user. Various other methods, systems, and computer-readable media are also disclosed.

20 Claims, 10 Drawing Sheets

(56) References Cited

U.S. PATENT DOCUMENTS

| | | | |
|---|---|---|---|
| 2017/0045941 A1* | 2/2017 | Tokubo | G06F 3/167 |
| 2017/0075425 A1 | 3/2017 | Kursula | |
| 2017/0124816 A1 | 5/2017 | Yang et al. | |
| 2017/0279183 A1* | 9/2017 | Togashi | H01Q 1/273 |
| 2017/0285736 A1* | 10/2017 | Young | G06F 3/013 |
| 2018/0055455 A1 | 3/2018 | Hu | |
| 2018/0253151 A1 | 9/2018 | Kletsov et al. | |
| 2018/0322335 A1 | 11/2018 | Golan et al. | |
| 2019/0346928 A1* | 11/2019 | Shahmohammadi | H04B 13/005 |

OTHER PUBLICATIONS

"Hot Mirror," accessed at https://en.wikipedia.org/wiki/Hot_mirror, accessed on Sep. 19, 2018, 1 page.

Seyedi et al., "Effect of Limb Joints and Limb Movement on Intrabody Communications for Body Area Network Applications", Journal of Medical and Biological Engineering, vol. 34, No. 3, Jan. 9, 2014, pp. 276-281.

Worgan et al., "PowerShake: Power Transfer Interactions for Mobile Devices", URL: https://dl.acm.org/citation.cfm?doid=2858036.2858569\, Proceedings of the CHI Conference on Human Factors in Computing Systems, May 7-12, 2016, 1 page.

Zang et al., "TouchPower: Interaction-based Power Transfer for Power-as-needed Devices", URL: https://dl.acm.org/citation.cfm?doid=3139486.3130986, Proceedings of the ACM on Interactive, Mobile, Wearable and Ubiquitous Technologies, vol. 1, Issue, 3, Article 121, Sep. 2017, 1 page.

Li et al., "Characterization of the implantable intra-body communication based on capacitive coupling by transfer function", URL: https://ieeexplore.ieee.org/document/7796259/, 10th International Conference on Sensing Technology (ICST), Nov. 11-13, 2016, 2 pages.

Cohn et al., "An Ultra-Low-Power Human Body Motion Sensor Using Static Electric Field Sensing", URL: https://dl.acm.org/citation.cfm?doid=2370216.2370233, UbiComp, Sep. 5-8, 2012, pp. 99-102.

"Glass", URL: https://www.x.company/glass/, as accessed on Aug. 13, 2018, pp. 1-3.

"AR Smart Glasses", URL: https://www.vuzix.com/products/blade-smart-glasses, as accessed on Aug. 13, 2018, 1 page.

"Google and Novartis Ink Deal for Smart Contact Lenses", URL: http://thetechielifestyle.blogspot.com/2014/07/google-and-novartis-ink-deal-for-smart.html, Jul. 16, 2014, 1 page.

Qualcomm, "The Mobile Future of Augmented Reality", Dec. 1, 2016, pp. 1-39.

Qualcomm, "VR and AR pushing connectivity limits", May 1, 2017, pp. 1-24.

Mazloum, Nafiseh Seyed, "Body-Coupled Communications: Experimental characterization, channel modeling and physical layer design", Dec. 2008, 120 pages.

Wegmueller et al., "Signal Transmission by Galvanic Coupling Through the Human Body", URL: https://ieeexplore.ieee.org/document/5280245/, IEEE Transactions on Instrumentation and Measurement, vol. 59, Issue. 4, Oct. 6, 2009, 1 page.

Ensworth et al., "Every smart phone is a backscatter reader: Modulated backscatter compatibility with Bluetooth 4.0 Low Energy (BLE) devices", URL: https://ieeexplore.ieee.org/document/7113076/, IEEE International Conference on RFID (RFID), Apr. 15-17, 2015, 1 page.

Yang et al., "Riding the airways: Ultra-wideband ambient backscatter via commercial broadcast systems", URL: https://ieeexplore.ieee.org/document/8057162/, IEEE INFOCOM—IEEE Conference on Computer Communications, May 1-4, 2017, pp. 1-3.

Post et al., "Intrabody Buses for Data and Power", Digest of Papers. First International Symposium on Wearable Computers, Oct. 13-14, 1997, pp. 52-55.

Zhang et al., "Enabling Practical Backscatter Communication for On-body Sensors", Proceedings of the ACM SIGCOMM Conference, Aug. 22-26, 2016, 14 pages.

Zimmerman, Thomas Guthrie, "Personal Area Networks (PAN): Near-Field Intra-Body Communication", Program in Media Arts and Science, Sep. 1, 1995, pp. 1-81.

Zhang et al., "Modeling and Characterization of the Implant Intra-Body Communication Based on Capacitive Coupling Using a Transfer Function Method", Sensors, vol. 14, Jan. 1, 2014, pp. 1740-1756.

Graham, Peter, "Emteq Reveals VR Facial Tracking Tech That Doesn't Require Cameras", URL: https://www.vrfocus.com/2016/09/emteq-reveals-vr-facial-tracking-tech-that-doesnt-require-cameras/, VRFocus, Sep. 12, 2016, pp. 1-7.

Cox, Graeme, "Emteq announces collaboration with Quantum Capture at Awe Europe", URL: https://emteq.net/blog/2017/10/19/press-release-awe2017, Emteq Ltd, Oct. 19, 2017, 3 pages.

"Tobii Pro Glasses 2", URL: https://www.tobiipro.com/product-listing/tobii-pro-glasses-2/, Tobii AB, as accessed on Aug. 13, 2018, pp. 1-14.

Qualcomm, "XR (Extended Reality) is Mobile Future", URL: http://booredatwork.com/qualcomms-xr-extended-reality-is-mobile-future/, Boredatwork, May 31, 2017, pp. 1-9.

"Smart Contact Lenses—Who's Got Their Eyes on the Prize?", URL: http://www.gadgethelpline.com/smart-contact-lenses-whos-got-their-eyes-on-the-prize/, Gadget Helpline, May 3, 2016, pp. 1-4.

Qualcomm, "Making Immersive Virtual Reality Possible in Mobile", Whitepaper, Mar. 1, 2016, pp. 1-17.

Qualcomm, "Driving the New Era of Immersive Experiences", Whitepaper, Oct. 1, 2015, pp. 1-15.

Gill, Ryan, "Human Body Communication Using Galvanic Coupling", ECE Senior Capstone Project, Tech Notes, 2017, pp. 1-3.

Song et al., "Review of the Modeling, Simulation and Implement of Intra-body Communication", Science Direct, Defence Technology, vol. 9, Oct. 30, 2013, pp. 10-17.

\* cited by examiner

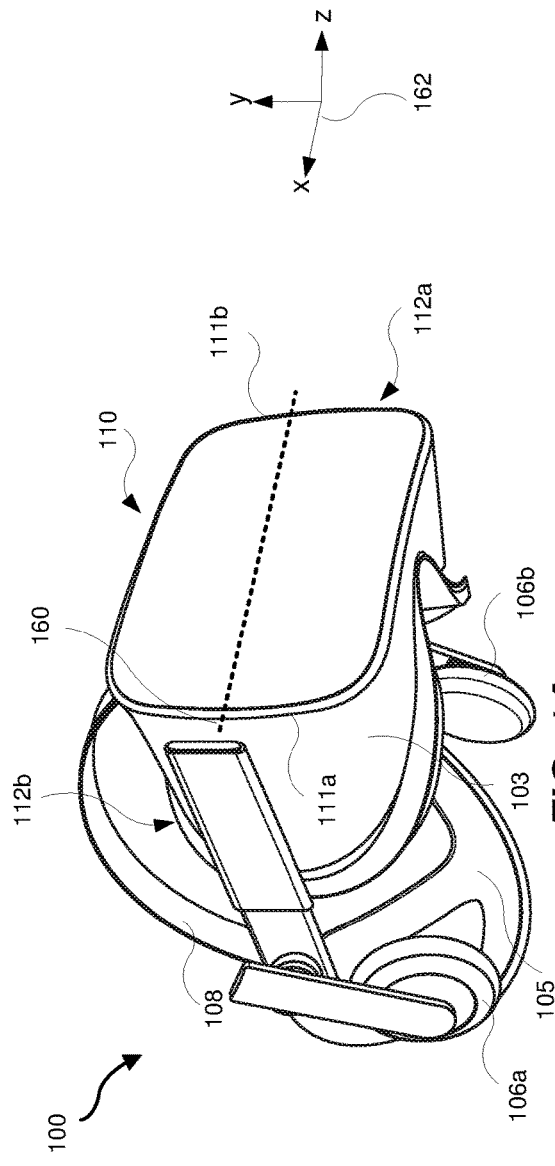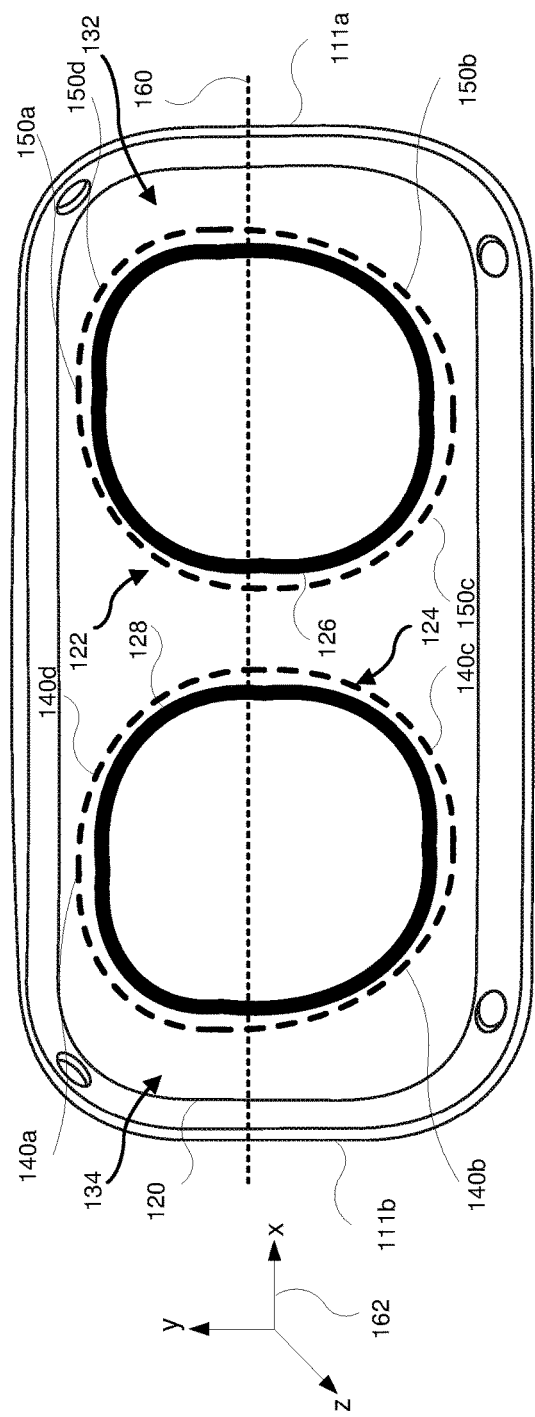

SYSTEMS AND METHODS FOR EYE TRACKING IN HEAD-MOUNTED DISPLAY DEVICES

BACKGROUND

In a virtual reality system, a user may wear a head-mounted display (HMD) that presents a virtual reality (VR) environment in front of the eyes of the user. As the eyes of user look forward, the user may be presented with a nearly distortionless view of an image in the VR environment. As the eyes of the user look to one side or the other side of the field of view of the image within the HMD, however, the image in the VR environment may appear distorted as viewed by the eyes of the user due to the introduction of, for example, optical aberrations.

SUMMARY

As will be described in greater detail below, the instant disclosure describes scatter systems and methods on millimeter waves that gather eye tracking information obtained by antennas included in an HMD for use in processing and adjusting an image in order to provide a user with a nearly distortionless view of the image in a VR environment independent of where the eyes of the user are focused. Such systems and methods, in some examples, may be used in a head-mounted display (HMD) (e.g., a near-eye display (NED) system). For example, the HMD may be used in an eyewear device for an augmented reality (AR), virtual reality (VR), or mixed reality (MR) system.

In one example, a computer-implemented method may include transmitting a first signal by a first antenna element included in a head mounted display system, subsequent to the transmitting, receiving a second signal by at least a second antenna element included in the head mounted display system, analyzing the second signal to determine multidimensional data for the second signal, comparing the multidimensional data for the second signal to known multidimensional data related to positions of a gaze of an eye of a user in the head mounted display system, identifying a position of a gaze for an eye of a user in the head mounted display system based on the comparison, and adjusting image data for display on a display device included in the head mounted display system based on the identified position of the gaze of the eye of the user.

Embodiments may include one or more of the following features, alone or in combination with one or more other features. For example, the first antenna element and the second antenna element may be included in an antenna array. The antenna array may be a circular array of miniaturized antenna elements surrounding a lens included in the head mounted display system. The first signal may be a millimeter wave. Transmitting the first signal by the first antenna element may include sequentially selecting an antenna element from the antenna array. Receiving the second signal by at least the second antenna element included in the head mounted display system may include receiving backscatter waves from the eye of the user. The method may further include, subsequent to the transmitting, receiving by all of the antenna elements included in the antenna array with the exception of the first antenna element, backscatter waves from the eye of the user. The antenna array may be outside of a field of view of the eye of the user. A first vector network analyzer may be associated with the first antenna element and a second vector network analyzer may be associated with the second antenna element. The method may further include generating, by the first vector network analyzer, a frequency for the first signal. The first vector network analyzer may transmit the first signal. The multidimensional data for the second signal may include a magnitude and phase of the second signal that is measured by a second network vector analyzer. The known multidimensional data related to positions of a gaze of an eye of a user in the head mounted display system may be stored in a database. The known multidimensional data stored in the database may be related to a known model of a standard head mounted display system. Adjusting the image data for display on the display device may include modifying the image data to eliminate chromatic aberrations.

In addition, a corresponding head mounted display system may include at least one physical processor, a first antenna element, a second antenna element, a display device; and a physical memory comprising computer-executable instructions that, when executed by the physical processor, cause the head mounted display system to transmit a first signal by the first antenna element, subsequent to the transmitting, receive a second signal by at least the second antenna element, analyze the second signal to determine multidimensional data for the second signal, compare the multidimensional data for the second signal to known multidimensional data related to positions of a gaze of an eye of a user in the head mounted display system, identify a position of a gaze for an eye of a user in the head mounted display system based on the comparison, and adjust image data for display on the display device based on the identified position of the gaze of the eye of the user.

Embodiments may include one or more of the following features, alone or in combination with one or more other features. For example, the head mounted display system may further include an antenna array, and the first antenna element and the second antenna element may be included in the antenna array. The head mounted display system may further include at least one lens. The antenna array may be a circular array of miniaturized antenna elements surrounding the lens. The first signal may be a millimeter wave. The instructions that cause the head mounted display system to transmit the first signal by the first antenna element may further include instructions that cause the head mounted display system to sequentially select an antenna element from the antenna array. The instructions that cause the head mounted display system to receive the second signal by the at least the second antenna element may further include instructions that cause the head mounted display system to receive backscatter waves from the eye of the user. The head mounted display system may further include a first vector network analyzer associated with the first antenna element, and a second vector network analyzer associated with the second antenna element. The instructions, when executed by the physical processor, may further cause the head mounted display system to generate, by the first vector network analyzer, a frequency for the first signal for transmission by the first antenna element, and measure, by the second vector network analyzer, the multidimensional data for the second signal. The head mounted display system may further include a database. The known multidimensional data related to positions of a gaze of an eye of a user in the head mounted display system may be are stored in a look-up table in the database. Adjusting the image data for display on the display device includes modifying the image data to eliminate chromatic aberrations.

In some examples, the above-described method may be encoded as computer-readable instructions on a computer-readable medium. For example, a computer-readable medium may include one or more computer-executable instructions that, when executed by at least one processor of a computing device, may cause the computing device to transmit a first signal by a first antenna element included in a head mounted display system, subsequent to the transmitting, receive a second signal by at least a second antenna element included in the head mounted display system, analyze the second signal to determine multidimensional data for the second signal, compare the multidimensional data for the second signal to known multidimensional data related to positions of a gaze of an eye of a user in the head mounted display system, identify a position of a gaze for an eye of a user in the head mounted display system based on the comparison, and adjust image data for display on a display device included in the head mounted display system based on the identified position of the gaze of the eye of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 1A is a view of a head mounted display system in accordance with an embodiment of the present technology.

FIG. 1B is another view of a head mounted display system in accordance with an embodiment of the present technology.

Figure 2:
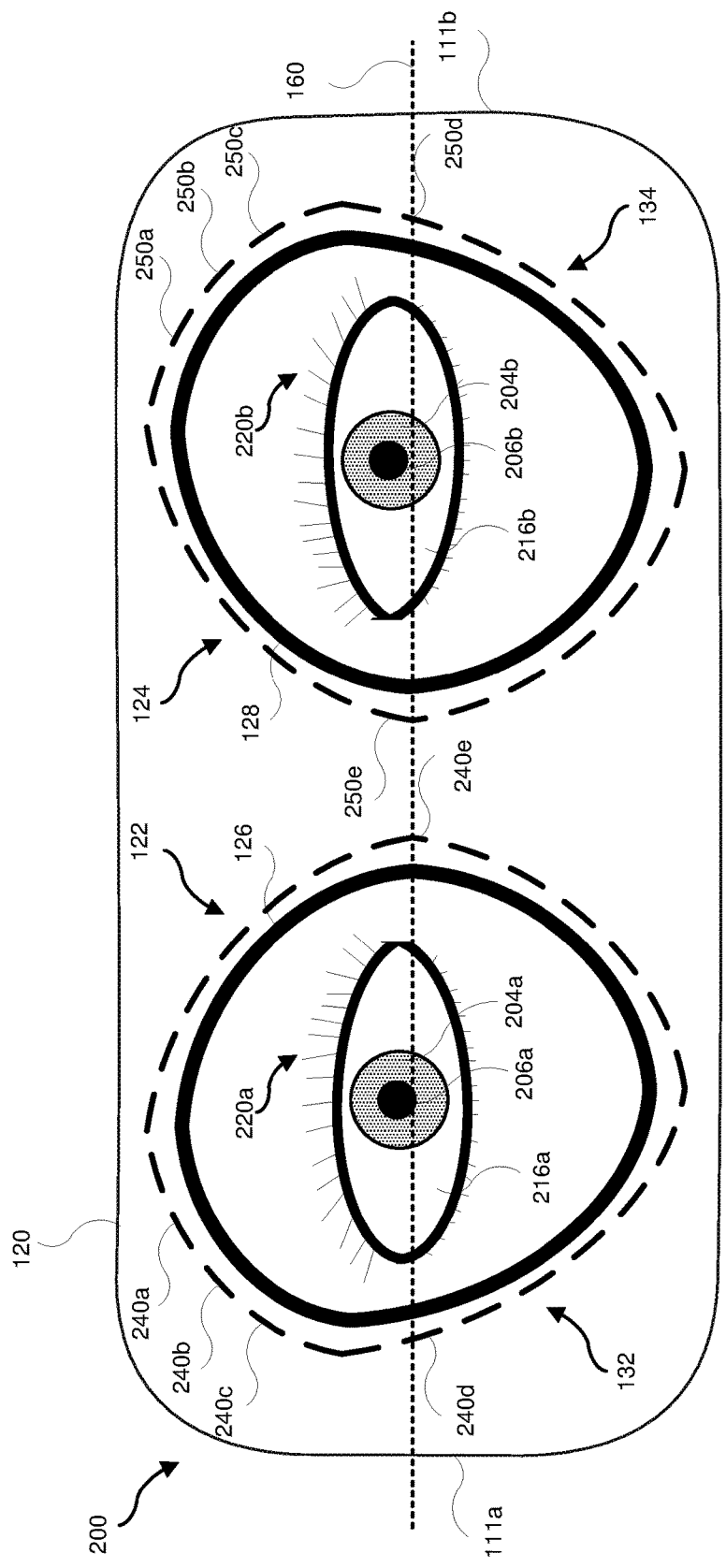
FIG. 2 is an example perspective view of a head mounted display system that shows the eyes of a user looking forward and towards the distal portion as viewed from a perspective external to the head mounted display system while looking into the distal portion.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to eye tracking in a head mounted display system (which may also be referred to herein as a head mounted display device or an HMD). The eye tracking may be performed using a backscatter method on millimeter waves (mmwaves) on a miniaturized antenna included in the HMD. As will be explained in greater detail below, embodiments of the instant disclosure may, in some implementations, use backscatter on mmwaves for distance measurement. Due to different permeabilities of the human eye at different angles, an eye position angle may be estimated using backscatter on mmwaves. An antenna array included in the HMD may be a circular array of multiple miniaturized antenna elements placed around each lens in the HMD. Each antenna array may be placed outside of the field of view of the user.

In some implementations, the backscatter method may sequentially select one antenna element as a transmitter with the remaining antenna elements in the antenna array being receivers. Each antenna element may have an associated vector network analyzer. A vector network analyzer may generate the signal for transmitting at a selected frequency and may then measure a magnitude and phase of the return signals (multidimensional information) received from the receivers. The return signals may be compared to and/or correlated with a status (e.g., a position, a viewing angle) of a human eye based on a standard model of a device. In addition, or in the alternative, the comparison may use a predicate device. The data related to the eye status, that is based on multidimensional information, may be trained data stored in a database (e.g., in a look-up table (LUT) in memory).

The use of a backscatter method on mmwaves on a miniaturized antenna in an HMD may provide low power, fast, and accurate eye tracking in a HMD resulting in an improved experience for the user. Using the eye tracking information, the image as viewed by the user in the HMD may be processed and adjusted based on the position of the eyes of the user (e.g., the viewing angle of the eyes of the user with the image), eliminating optical aberrations that may distort the view of the image in the VR environment. The backscatter method on mmwaves on a miniaturized antenna can be used in a HMD as an alternative to electrooculography or other types of vision-based eye tracking that may involve complicated implementations that could negatively impact image latency and energy consumption of the HMD.

FIG. 1A is an overall front view of a head mounted display system 100 in accordance with an embodiment of the present technology. The head mounted display system 100 includes a pair of earphone assemblies 106a-b, an adjustable strap assembly 108, and an enclosure (e.g., a display housing 110). The strap assembly 108 may extend from the display housing 110 to a support portion 105 configured to be worn on a head of a user. The strap assembly 108 may be configured to support the head mounted display system 100 on the head of the user.

The display housing 110 includes a front cover with an exterior surface 103. The display housing 110 extends between a first end portion 111a (e.g., a right side portion) and a second end portion 111b (e.g., a left side portion). The display housing 110 further extends between a distal portion 112a and a proximal portion 112b, respectively. Center line 160 is along an "x" axis 162 and extends between the first end portion 111a and the second end portion 111b. When the user is wearing the head mounted display system 100, the distal portion 112a corresponds to a front portion of the display housing located farthest from a face of a user, and the proximal end portion 112b corresponds to a rear portion of the display housing located closer or adjacent to the face of the user.

In operation, a user may place the support portion 105 on the back of a head of the user and adjust the adjustable strap assembly 108 in order to position the proximal end portion 112b of the display housing 110 snugly against the face of the user and generally around and in front of the eyes of the user. As such, the eyes of the user look towards the distal portion 112a.

FIG. 1B is an example interior or inside view of the head mounted display system 100 as seen by eyes of a user as the eyes look towards the distal portion 112a while the user is wearing the head mounted display system 100 on a head of the user. The display housing 110 may include one or more optical assemblies. Each optical assembly may include a respective lens. In some implementations, each lens may be coupled to a single display device. In some implementations, each lens may be coupled to a corresponding display device.

In the example shown in FIG. 1B, the display housing 110 may include two optical assemblies (e.g., shown generally as optical assembly 132 and optical assembly 134). The optical assembly 132 and the optical assembly 134 include a first lens 126 and a second lens 128, respectively. The optical assembly 132 and the optical assembly 134 may be coupled to a display device 120. Embodiments of the present disclosure may include one or more antenna arrays. Each antenna array may surround (encircle) a respective optical lens. For example, as shown in FIG. 1B, a first antenna array 122 surrounds the first lens 126. A second antenna array 124 surrounds the second lens 128. The optical assembly 132 may include the first antenna array 122. The optical assembly 134 may include the second antenna array 124.

In some implementations, each antenna array (e.g., the first antenna array 122 and the second antenna array 124) may include a plurality of antenna elements (miniaturized antennas or mini-antennas). The mini-antennas may be placed in an antenna array such that the mini-antennas form a circle (e.g., an oval or a circular pattern) that fully surrounds an optical lens. In addition, the mini-antennas may be placed outside of the field of view of the user as they look through the distal portion 112a (and the first lens 126 and the second lens 128) of the display housing 110. Each antenna included in an antenna array may be capable of both transmitting and/or receiving millimeter waves (mmwaves).

A millimeter wave may be a wave in the electromagnetic radiation spectrum between 30 gigahertz (Ghz) and 300 Ghz.

Antenna elements 140a-d are representative elements that are included in the antenna array 122 along with additional antenna elements. Antenna elements 150a-d are representative elements that are included in the antenna array 124 along with additional antenna elements.

FIG. 2 is an example perspective view 200 of the head mounted display system 100 that shows the eyes of a user (e.g., a first eye 220a and a second eye 220b) looking forward and towards the distal portion 112a as viewed from a perspective external to the head mounted display system 100 while looking into the distal portion 112a of the head mounted display system 100.

Figure 3:
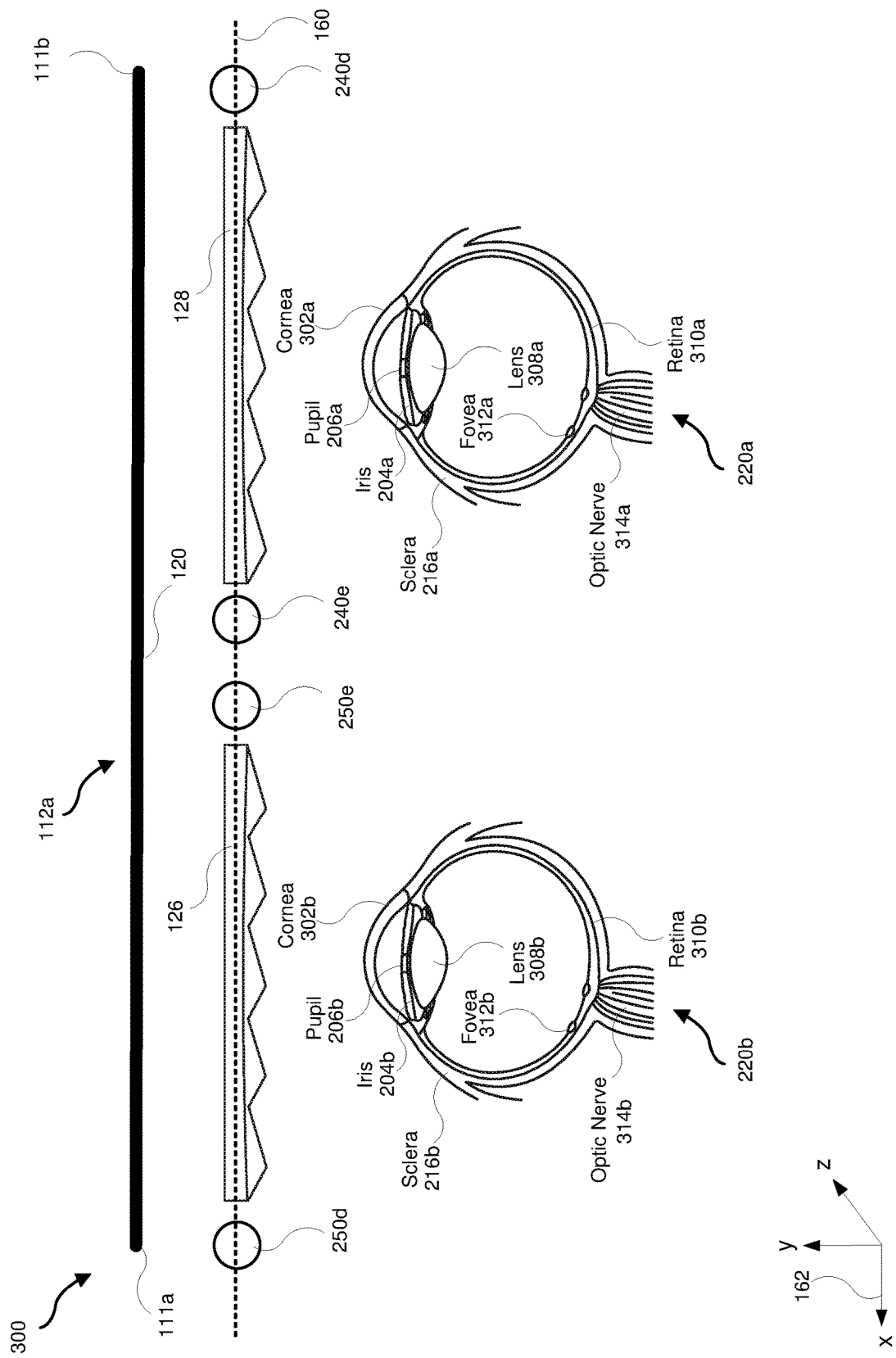
FIG. 3 is an example cross-sectional view of a head mounted display system that shows an internal view of a cross-section of the eyes of the user looking forward and towards the distal portion.

FIG. 3 is an example cross-sectional view 300 of the head mounted display system 100 that shows an internal view of a cross-section of the eyes of the user (e.g., the first eye 220a and the second eye 220b) looking forward and towards the distal portion 112a of the head mounted display system 100. The first eye 220a is looking forward and through the first lens 126. The second eye 220b is looking forward and through the second lens 128.

As shown in FIGS. 1 and 2, mini-antennas (e.g., antenna elements 240a-e, the antenna elements 140a-d) may be placed in the antenna array 122 such that the mini-antennas form a circle (e.g., an oval or a circular pattern) that fully surrounds the first optical lens 126. As shown in FIGS. 1 and 2, mini-antennas (e.g., antenna elements 250a-e, the antenna elements 150a-d) may be placed in the antenna array 124 such that the mini-antennas form a circle (e.g., an oval or a circular pattern) that fully surrounds the second optical lens 128. In addition, as shown in FIG. 2, the mini-antennas may be placed in the antenna array outside of the field of view of the user as they look through the distal portion 112a (and the first lens 126 and the second lens 128) of the display housing 110. The antenna elements 240a-e are representative elements that are included in the antenna array 122 along with additional antenna elements. The antenna elements 250a-e are representative elements that are included in the antenna array 124 along with additional antenna elements.

Referring to FIGS. 2 and 3, a backscatter method may sequentially select one antenna element in an antenna array as the transmitter of a millimeter wave (mmwave) while the remaining antenna elements in the antenna array are receivers of a backscattering of the transmitted mmwave from the eyes of the user. In some implementations, the sequential selection of one antenna element in an antenna array as the transmitter may be performed at the same time (or very close to the same time) for each antenna array. For example, at a time, t1, the antenna element 240a may be selected as a transmitter in the antenna array 122 and at the time, t1, the antenna element 250a may be selected as a transmitter in the antenna array 124. At a time, t2, later than the time, t1, the antenna element 240b may be selected as a transmitter in the antenna array 122 and the antenna element 250b may be selected as a transmitter in the antenna array 124. At a time, t3, later than the time, t2, the antenna element 240c may be selected as a transmitter in the antenna array 122 and the antenna element 250c may be selected as a transmitter in the antenna array 124.

One would understand that this sequencing may be continuously performed over a period of time, with a time delay of $\Delta t$ (e.g., $\Delta t = t2 - t1$) between sequential antenna elements. For example, the time delay between the transmitting of a mmwave from a first antenna element to a second transmitter antenna element (e.g., $\Delta t$) may be a factor of the selected transmission frequency. In some implementations, the faster the sequencing of the selection of the transmission antenna element, the more accurate (e.g., the more real-time) the determination of the position of eye (e.g., better and more accurate eye tracking). However, the faster the sequencing of the selection of the transmission antenna element, the more system resources that may be consumed. Therefore, a trade off may be made between the conserving of system resources and the accuracy of the eye tracking.

In some implementations, the sequencing of the selection of an antenna element as a transmitter is performed in a particular direction from one adjacent antenna element to another. In the example described above, the sequencing from antenna element 240a, to antenna element 240b, and to antenna element 240c sequences in a clockwise direction around the antenna array 122. Similarly, in the example described above, the sequencing from antenna element 250a, to antenna element 250b, and to antenna element 250c sequences in a clockwise direction around the antenna array 124. The sequencing may traverse each antenna element in a particular direction (e.g., clockwise, counterclockwise) continuously. In some implementations, the backscatter method may sequence the selection of a transmitter element in one antenna array in a clockwise direction while sequencing the selection of a transmitter element in the other antenna array in a counterclockwise direction.

As the backscatter method sequentially selects one antenna element in an antenna array for each antenna array (e.g., the antenna array 122 and the antenna array 124) as a transmitter of a millimeter wave (mmwave), the backscatter method uses the remaining antenna elements in each of the antenna arrays (e.g., the antenna array 122 and the antenna array 124) as receivers of a backscattering (reflection or redirection) of the transmitted mmwave from the eyes of the user. For example, the backscatter method may select antenna element 240a as a transmitter. The backscatter method may use the antenna element 240a to transmit a mmwave. The remaining antenna elements in the antenna array 122 may be receivers of a backscattering or reflection of the transmitted mmwave from the eye 220a. Similarly, for example, the backscatter method may select antenna element 250a as a transmitter. The backscatter method may use the antenna element 250a to a transmit mmwave. The remaining antenna elements in the antenna array 124 may be receivers of a backscattering or reflection of the transmitted mmwave from the eye 220b.

Due to different permeabilities of a human eye at different angles, an eye position angle (a gaze position of a human eye) may be estimated using the received backscattering of transmitted mmwaves. Referring to FIGS. 2 and 3, each eye (the eye 220a and the eye 220b) may include a sclera (e.g., the "white" or opaque part of a human eye) (sclera 216a and sclera 216b, respectively), an iris (e.g., the "colored" part or circle in a human eye that surrounds a pupil) (iris 204a and iris 204b, respectively), and a pupil (e.g., the "hole" located in the center of a human eye that appears black) (pupil 206a and pupil 206b). Due to the coloring, composition, and location of each part of a human eye dependent on a gaze direction, a backscattering of mmwaves from the human eye will differ based on the permeability of each part of the human eye and the gaze direction of the eye when the mmwaves contact and are scattered off (or reflected from) the eye.

The antenna elements in the antenna array 122 and the antenna array 124 that are not used as a transmitter antenna element may be used as receiver antenna elements, receiving (gathering or collecting) the backscattered (or reflected) mmwaves. A magnitude and phase of the backscattered mmwaves, as compared to the frequency of the transmitted signal, may be used to determine a position angle (a gaze direction) of the eye.

For example, the antenna element 240a and the antenna element 250a may transmit a high frequency pulse (e.g., a millimeter wave at a frequency equal to or greater than 60 Ghz). The remaining antenna elements in the antenna array 122 and the remaining antenna elements in the antenna array 124 may receive backscattered signals (reflected signals) of a magnitude and phase, in comparison to the frequency of the transmitted signal, that is dependent upon what part of the eye (e.g., the eye 220a and the eye 220b, respectively) was responsible for the backscattered signal.

In some implementations, each antenna element may have an associated vector network analyzer. A vector network analyzer may generate the mmwave signal for transmitting at a selected frequency and may measure a magnitude and phase (e.g., a frequency) of a return signal (multidimensional information) received by the receiver. The magnitude and phase of each return signal may be compared to and/or correlated with a status of an eye (e.g., a position of an eye) based on a known model of a standard device. In addition, or in the alternative, the comparison may use a predicate device.

For example, training data related to eye status based on multidimensional information may be stored in a database in, for example, a look-up table (LUT). The training data may include multidimensional information of a return signal associated with an eye position angle (a gaze position of a human eye) and a frequency of a transmitted pulse in, for example, the head mounted display system 100 as shown in FIGS. 1A-B. The stored training data related to eye status based on multidimensional information may be referred to as eye tracking information. The eye tracking information may be data that relates a position (gaze or orientation) of an eye in the head mounted display system 100 to a received magnitude and phase of a return signal at an element of an antenna array as determined by a backscatter method that may transmit a signal from a transmitter antenna element at a selected frequency.

For example, referring to FIGS. 2 and 3, the antenna element 240a may be selected as a transmitter antenna element. The frequency of the transmitted signal may be selected to be a particular frequency. A magnitude and phase of backscattered signals may be measured by the remaining antenna elements (e.g., the antenna element 240d and the antenna element 240e). A training system can be established that stores the particular antenna element chosen as the transmitter antenna element (e.g., antenna element 240a), the frequency of the signal transmitted by the transmitter antenna element, the receiving antenna elements (e.g., the antenna element 240d and the antenna element 240e), and the magnitude and phase of the signals received by each of the receiving antenna elements. The stored data may be correlated with a known position of an eye, therefore, establishing the training system. The training data may be stored in memory in a database (e.g., in a look-up table in the database). The described process may be repeated for each element included in the antenna array and for each position of an eye. In addition, the described process may be repeated for different frequency transmitter signals.

The stored training data may be used for tracking the position of the eyes of a user in a head mounted display system (e.g., the head mounted display system 100). A backscatter method may select a particular antenna element as the transmitter element, may select a frequency for transmitting a signal from the selected transmitter element, and may measure (obtain) the magnitude and phase of backscattered signals (multidimensional information) at each of the remaining antenna elements. The backscatter method may use this data and information to access a database (access a lookup table) that may provide an eye position angle (a gaze position of a human eye) based on trained data.

The sequential selection of a transmitter antenna element from among the antenna elements included in an antenna array and knowing the particular antenna element selected as the transmitter element, the frequency of the signal transmitted by the selected antenna element, and the multidimensional information received at each of the remaining antenna elements may be used to track the movement of the eyes of a user. In some implementations, dependent on the frequency of the measurements, the eye tracking may also be able to determine if and when a user blinks.

Figure 4:
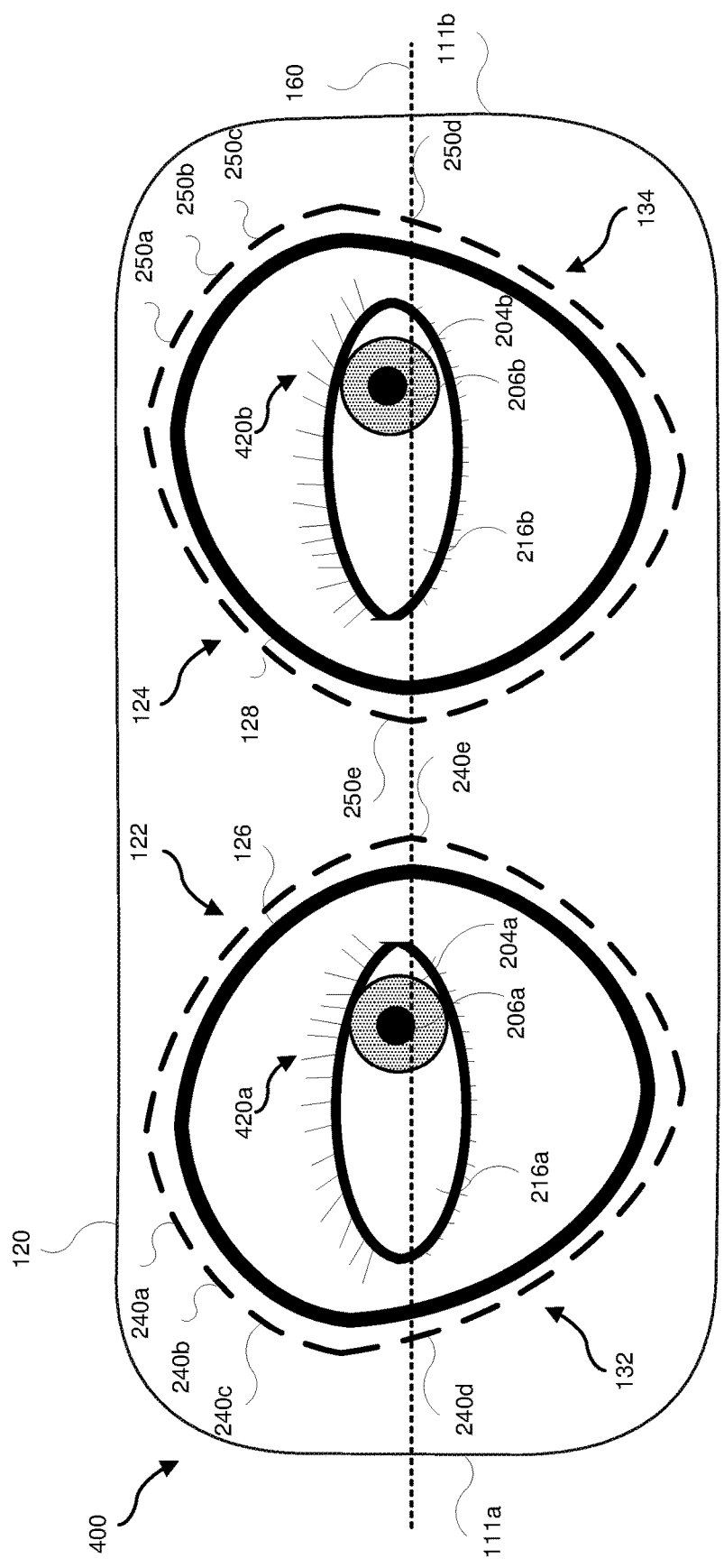
FIG. 4 is an example perspective view of a head mounted display system that shows the eyes of a user looking to the left and towards the second end portion as viewed from a perspective external to the head mounted display system while looking into the distal portion.

FIG. 4 is an example perspective view 400 of the head mounted display system 100 that shows the eyes of a user (e.g., a first eye 420a and a second eye 420b) looking to the left and towards the second end portion 111b as viewed from a perspective external to the head mounted display system 100 while looking into the distal portion 112a of the head mounted display system 100.

Figure 5:
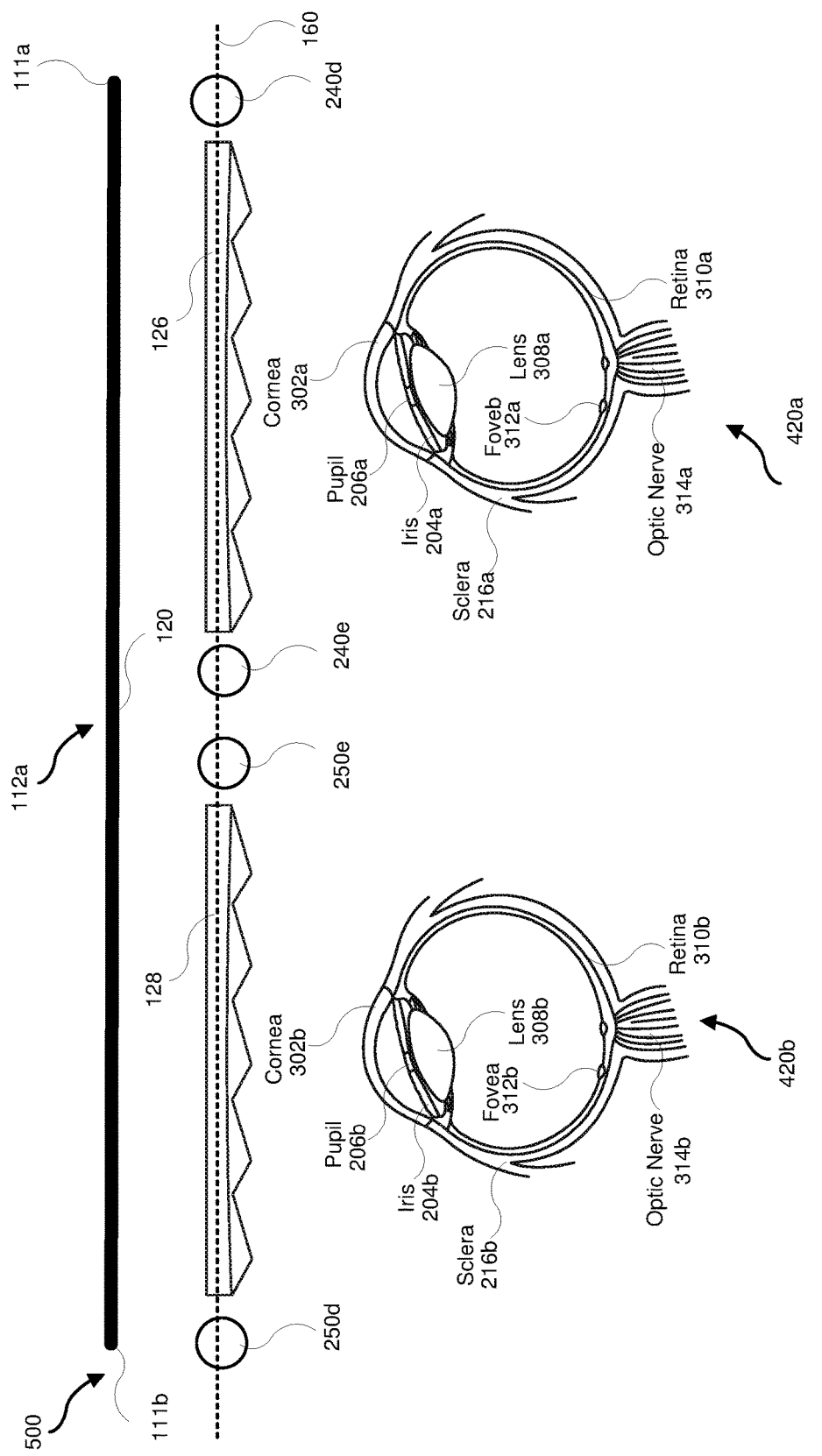
FIG. 5 is an example cross-sectional view of a head mounted display system that shows an internal view of a cross-section of the eyes of the user looking to the left and towards the second end portion.

FIG. 5 is an example cross-sectional view 500 of the head mounted display system 100 that shows an internal view of a cross-section of the eyes of the user (e.g., the first eye 420a and the second eye 420b) looking to the left and towards the second end portion 111b of the head mounted display system 100. The first eye 420a is looking towards the left and through the first lens 126. The second eye 220b is looking towards the left and through the second lens 128.

Figure 6:
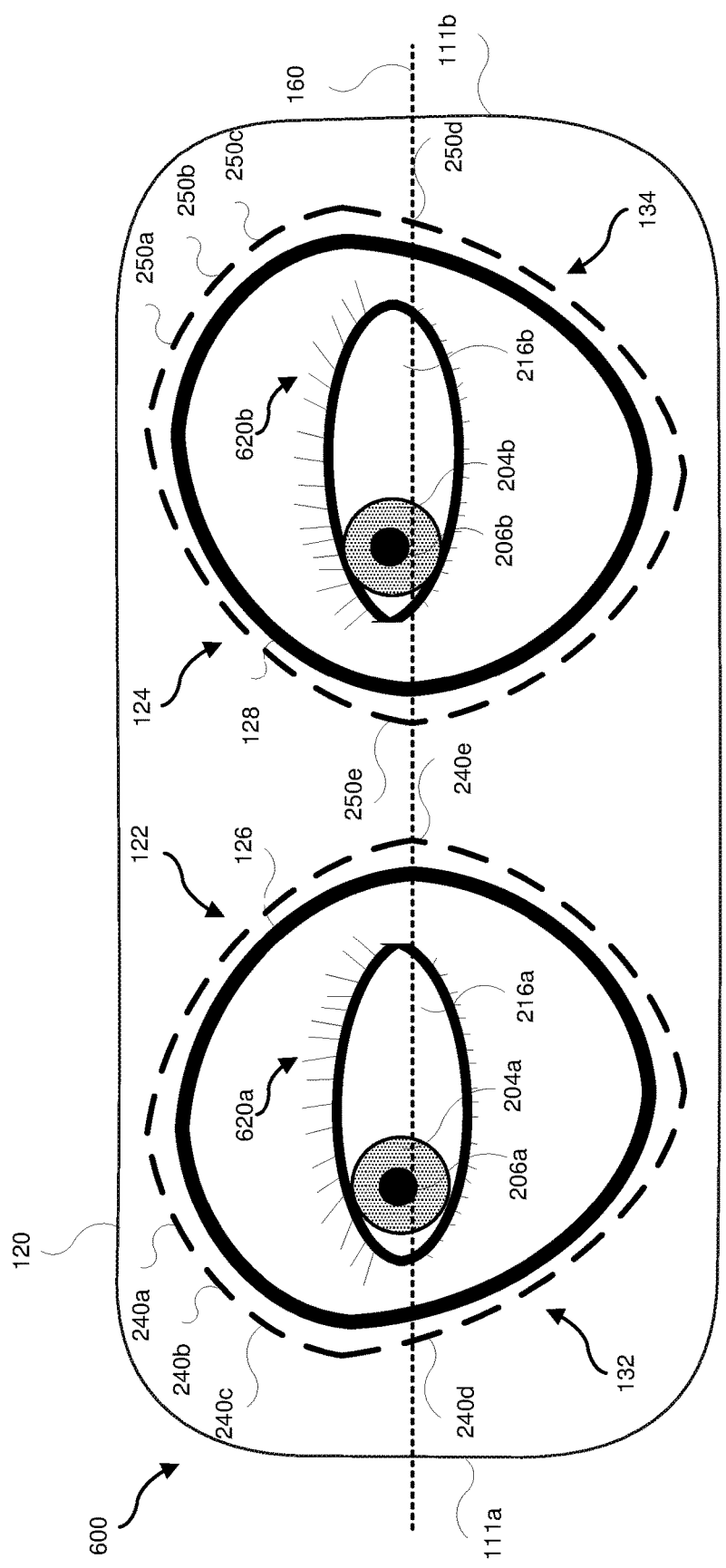
FIG. 6 is an example perspective view of a head mounted display system that shows the eyes of a user looking to the right and towards the first end portion as viewed from a perspective external to the head mounted display system while looking into the distal portion.

FIG. 6 is an example perspective view 600 of the head mounted display system 100 that shows the eyes of a user (e.g., a first eye 620a and a second eye 620b) looking to the right and towards the first end portion 111a as viewed from a perspective external to the head mounted display system 100 while looking into the distal portion 112a of the head mounted display system 100.

Figure 7:
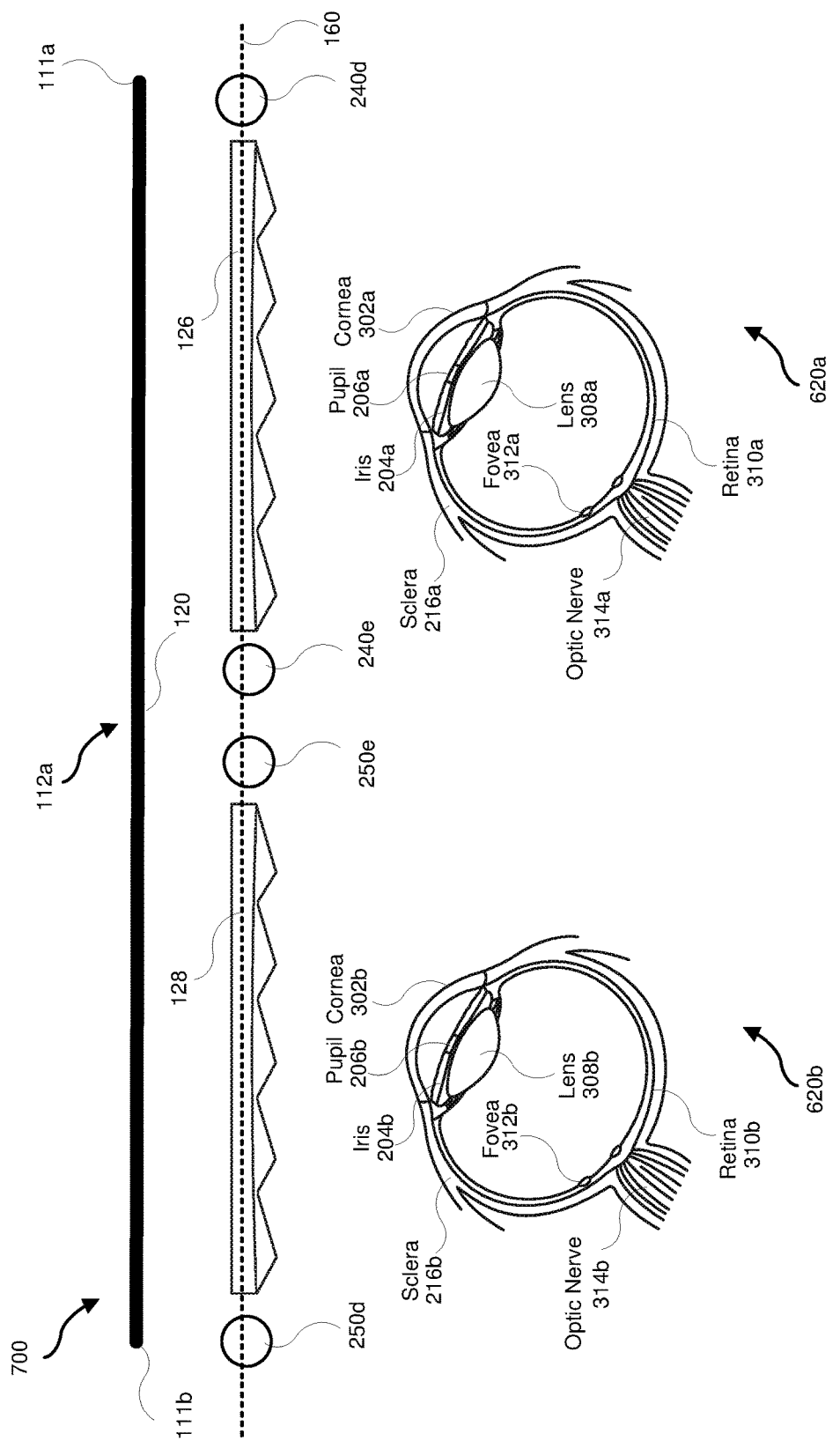
FIG. 7 is an example cross-sectional view of the head mounted display system that shows an internal view of a cross-section of the eyes of the user looking to the right and towards the first end portion.

FIG. 7 is an example cross-sectional view 700 of the head mounted display system 100 that shows an internal view of a cross-section of the eyes of the user (e.g., the first eye 620a and the second eye 620b) looking to the right and towards the first end portion 111a of the head mounted display system 100. The first eye 620a is looking towards the right and through the first lens 126. The second eye 620b is looking towards the right and through the second lens 128.

As shown in FIG. 2 and FIG. 3, eyes 220a-b are looking forward. As shown in FIG. 4 and FIG. 5, eyes 420a-b are looking towards the second end portion 111b of the head mounted display system 100 (e.g., the user is looking towards the left). As shown in FIG. 6 and FIG. 7, eyes 620a-b are looking towards the first end portion 111a of the head mounted display system 100 (e.g., the user is looking towards the right). In some implementations, each cross-sectional view of the eyes of a user shown in FIGS. 2-7 may be for a same user.

Referring to FIGS. 2-7, for example, each human eye (eyes 220a-b, eyes 420a-b and eyes 620a-b) may include a respective cornea 302a-b, a respective lens 308a-b, a respective fovea 312a-b, and a respective optic nerve 314a-b that when included with respective pupils 206a-b, irises 204a-b, and scleras 216a-b each constitute a human optical system. Though described for the eye 220a, the following description also applies to each eye 220b, 420a-b, and 620a-b.

For example, a human eye (e.g., the eye 220a) may produce optical aberrations in which the cornea (e.g., cornea 302a), lens (e.g., lens 308a), and other portions of the eye that constitute the human optical system cause light entering the eye through a pupil (e.g., the pupil 206a) to not be properly focused on the retina (e.g., retina 310a). The optical aberrations may produce a blurring of the resulting image as focused on the retina.

Generally, aberrations may fall into two categories: monochromatic aberrations (e.g., defocus, astigmatism, spherical aberration, and so on), which may result in improper focusing of portions of light having different wavelengths and which may be caused by the geometry (e.g., location, shape, orientation, etc.) of various portions of the eye, and chromatic aberrations (e.g., axial aberrations and lateral aberrations), which may result in different portions of light having different wavelengths being focused at different locations within the eye.

In some cases, chromatic aberrations may be caused at least in part by portions of the eye (e.g., the lens of the eye) having different indexes of refraction with respect to different wavelengths of incident light. More specifically, axial (or longitudinal) chromatic aberration may cause light having different wavelengths to be focused at different depths or positions along the optical axis of the eye (e.g., in front of or behind the retina), while lateral (or transverse) chromatic aberration may cause light having different wavelengths to be focused at different lateral locations (e.g., along the retina).

While at least most types of significant monochromatic aberrations (e.g., defocus, astigmatism, spherical aberration, and the like) may vary greatly from one viewer to another, axial chromatic aberration may be relatively constant from one viewer to the next. Moreover, the amount of lateral chromatic aberration experienced by the viewer may depend on either or both the position of light in the pupil and the angle of incidence of the light when entering the eye. The angle of incidence of the light when entering the eye may be greater when a user is viewing an image peripherally (e.g., looking to the left as in FIGS. 4 and 5, and looking to the right as in FIGS. 6 and 7) resulting in an increase in the amount of chromatic aberrations as the user views the image using peripheral vision (e.g., looking from side-to-side, looking up-and-down).

In some embodiments, a focusing lens (e.g., first optical lens 126) or other optical element placed between an image displayed on a display device 120 and the eye 220a may cause an image of converging light to focus on, for example, a fovea 312a (e.g., the region of eye 220a where the center of the field-of-vision may be focused and where retinal cones are particularly concentrated) of retina 310a, near the entry point of optic nerve 314a, which may be considered the portion of retina 310a that provides the highest resolution.

In some implementations, chromatic aberrations may be caused at least in part by the lens 126 and the lens 128. For example, referring to FIGS. 4 and 5, a chromatic aberration may be a visual artifact viewed by the eyes of a user (e.g., eyes 420a-b) when viewing an image displayed on the display device 120 through the lens 126 and the lens 128, respectively. For example, referring to FIGS. 4 and 5, a chromatic aberration may be a visual artifact viewed by the eyes of a user (e.g., eyes 620a-b) when viewing an image displayed on the display device 120 through the lens 126 and the lens 128, respectively. A chromatic aberration may cause colored fringes to be visible around objects in an image. This visual effect may become increasingly more apparent to a user viewing the image as the view of the user moves from viewing the image straight on (e.g., the example shown in FIGS. 2 and 3) to viewing the image peripherally (in a peripheral vision of the eyes of the user) (e.g., the example shown in FIGS. 4 and 5 and the example shown in FIGS. 6 and 7) because the view shifts away for a center of the lens.

The visual effect may be due to a refractive index of the lens 126 and a refractive index of the lens 128 varying for different wavelengths of light incident on each lens. For example, shorter wavelengths of light that are towards a blue end of the light spectrum may be refracted less than longer wavelengths of light that are towards the red end of the light spectrum. In some implementations, an image displayed on the display device 120 for viewing by the eyes of a user (e.g., eyes 220a-b, eyes 420a-b, and eyes 620a-b) in the head mounted display system 100 may include individual red, green, and blue pixels making the displayed image susceptible to the unwanted effects of chromatic aberration. The visual effect as viewed by the eyes of the user may be that the red, green, and blue components of the image appear to be scaled out radially, and by differing amounts. Exactly how apparent the visual effect is may depend on the image content and the eye position angle.

Using eye tracking information, as described herein, to determine a viewing angle (or gaze) of the eyes of the user looking at an image displayed on the display device 120, the image as subsequently viewed by the user in the head mounted display system 100 may be processed and/or adjusted based on the determined position of the eyes of the user. For example, the processing and/or adjusting of the image may be based on the determined viewing angle of the eyes of the user (e.g., eyes 420a-b) compensating for chromatic aberrations introduced by the angle of view of the eyes of the user (e.g., eyes 420a-b) through each lens (e.g., lens 126 and lens 128, respectively) as well as compensating for any chromatic aberrations as introduced by the portions of the eyes (e.g., the lens 308a and the lens 308b) having different indexes of refraction with respect to different wavelengths of incident light on each eye 420a-b. The processing and/or adjusting of the image to eliminate any optical and/or chromatic aberrations that may distort the view of the image may provide the user with an improved viewing experience.

Figure 8:
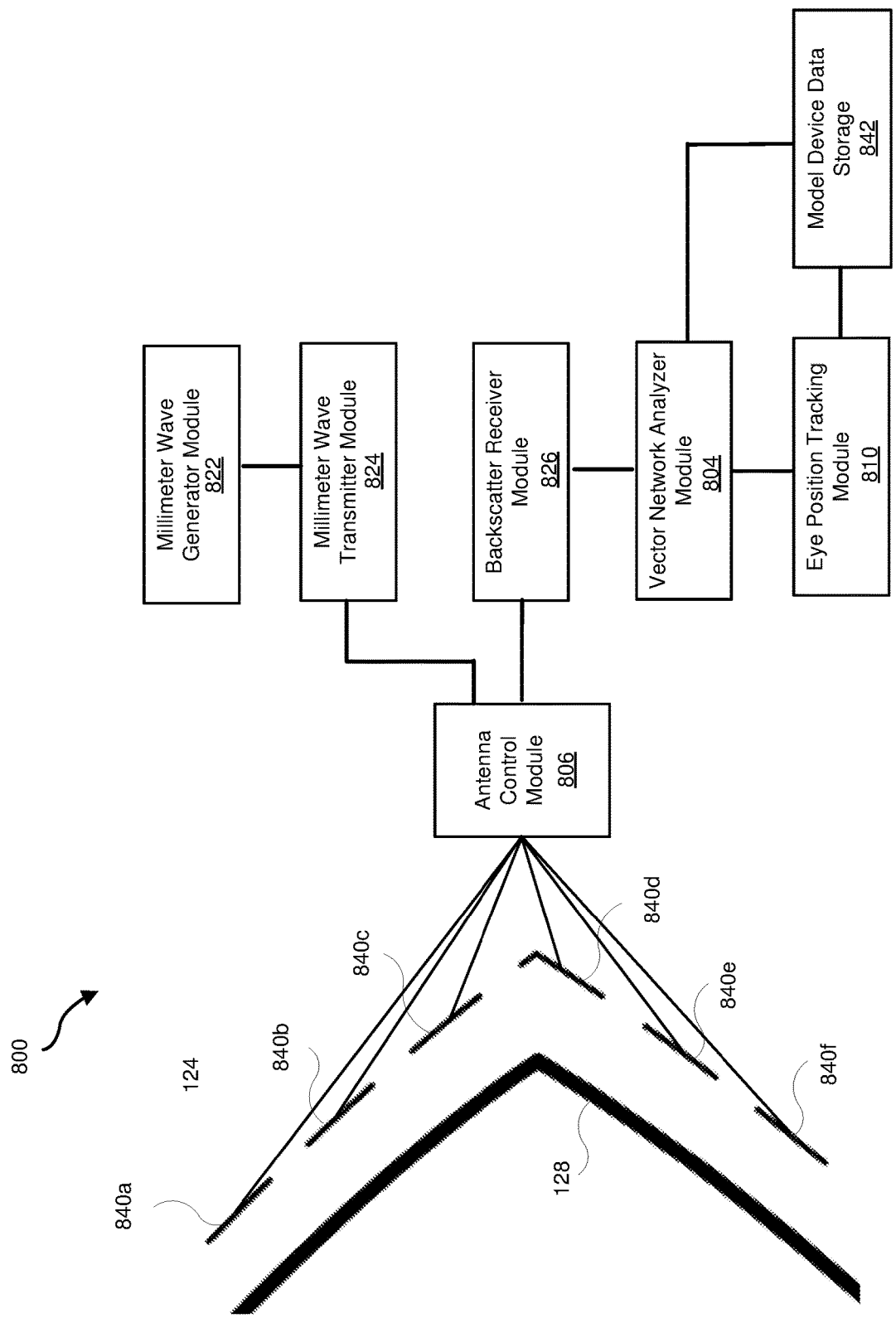
FIG. 8 is a block diagram of an exemplary system for tracking a position of an eye of a user.

FIG. 8 is a block diagram of an exemplary system 800 for tracking a position of an eye of a user. The system 800 includes an antenna control module 806. The antenna control module 806 may control the interface to each antenna element included in the antenna array 124. For example, the antenna control module 806 may identify an antenna element as a transmitter (e.g., antenna element 840a). The antenna control module 806 may interface a millimeter wave transmitter module 824 to the antenna element 840a so that the antenna element 940a may transmit a mmwave at a selected frequency as provided by a millimeter wave generator module 822. The antenna control module 806 may receive multidimensional information (signals of a particular magnitude and phase) from each of the remaining antenna elements (e.g., antenna elements 840b-f) and provide the multidimensional information per antenna element to a backscatter receiver module 826. The backscatter receiver module 826 may provide the multidimensional information per antenna element to a vector network analyzer module 804. The vector network analyzer module 804 may determine a magnitude (e.g., measure an amplitude) and phase of the signals received by each of the antenna elements. In some implementations, each antenna element may be interfaced to or coupled to a vector network analyzer. In these implementations, the vector network analyzer module 804 may include each vector network analyzer.

The vector network analyzer module 804 may interface with (be coupled to) a model device data storage 842. In some implementations, when training a system, the multidimensional information determined by the vector network analyzer module 804 may be stored in the model device data storage 842 along with additional information and data, such as, the frequency of the transmitted signal, and the position of the eye when the multidimensional information was obtained. In some implementations, the vector network analyzer module 804 may provide the multidimensional information to an eye position tracking module 810. The eye position tracking module 810 may access the trained data in the model device data storage 842 and compare the multidimensional information with the trained data to determine a position of an eye of a user.

Figure 9:
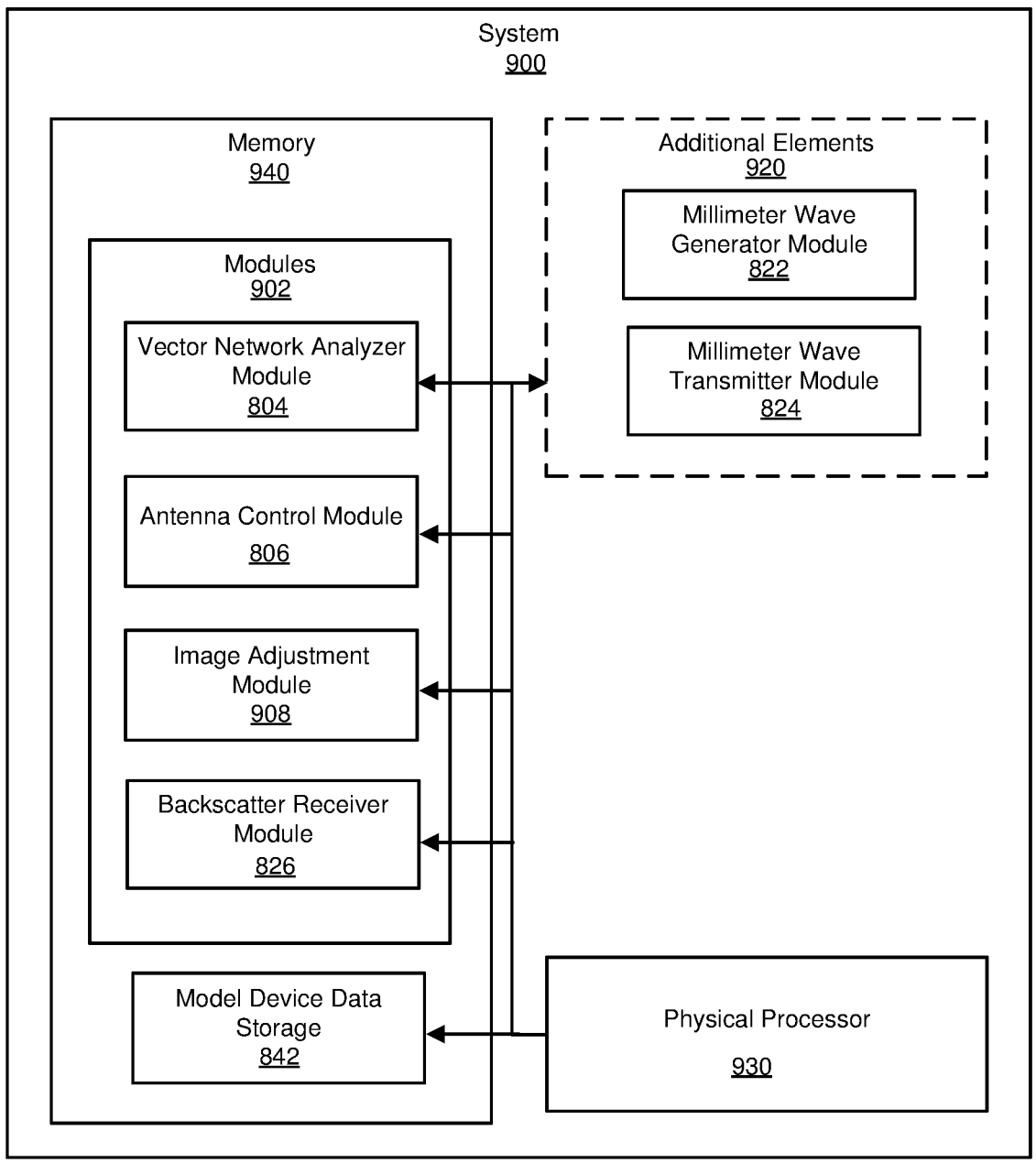
FIG. 9 is a block diagram of an example system that includes modules for use in an implementation of an eye tracking system for a head mounted display system.

FIG. 9 is a block diagram of an example system 900 that includes modules for use in an implementation of an eye tracking system for a head mounted display system (e.g., the head mounted display system 100). Modules 902 may include vector network analyzer module 804, antenna control module 806, image adjustment module 908, and eye position tracking module 810. Although illustrated as separate elements, one or more of modules 902 in FIG. 9 may represent portions of a single module or application.

In certain embodiments, one or more of modules 902 in FIG. 9 may represent one or more software applications or programs that, when executed by a computing device, may cause the computing device to perform one or more tasks. As illustrated in FIG. 9, example system 900 may also include one or more memory devices, such as memory 940. Memory 940 generally represents any type or form of volatile or non-volatile storage device or medium capable of storing data and/or computer-readable instructions. In one example, memory 940 may store, load, and/or maintain one or more of modules 902. Examples of memory 940 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 9, example system 900 may also include one or more physical processors, such as physical processor 930. Physical processor 930 generally represents any type or form of hardware-implemented processing unit capable of interpreting and/or executing computer-readable instructions. In one example, physical processor 930 may access and/or modify one or more of modules 902 stored in memory 940. Additionally or alternatively, physical processor 930 may execute one or more of modules 902. Examples of physical processor 930 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 9, example system 900 may also include one or more additional elements 920. The additional elements 920 generally represent any type or form of hardware and/or software. The additional elements 920 may include millimeter wave generator module 822, and millimeter wave transmitter module 824.

A determined position of an eye of a user may be provided to the image adjustment module 908. As described herein, the image adjustment module 908 may adjust the image for viewing by a user on a display device (e.g., the display device 120) included in a head mounted display system 100 based on the determined position of the eye of the user. The image adjustments may correct for optical and/or chromatic aberrations introduced into the view of the image by the user because of the eye position angle (e.g., the viewing angle of the user).

Referring to FIG. 8, the antenna control module 806 may identify another (a next) antenna element as a transmitter (e.g., antenna element 840b). The antenna control module 806 may interface the millimeter wave transmitter module 824 to the antenna element 840b so that the antenna element 840b may transmit a mmwave at a selected frequency as provided by the millimeter wave generator module 822, repeating the process in order to determine a next position of the eye of the user. As described herein, the process may be repeated as the antenna control module 806 identifies antenna elements included in the antenna array 124 as transmitters. In addition, the process may be performed synchronously for eye 220a and eye 220b.

In some cases, though described for one eye, the methods, systems, and processes described herein may be applied to each eye of a user (e.g., two eyes).

Figure 10:
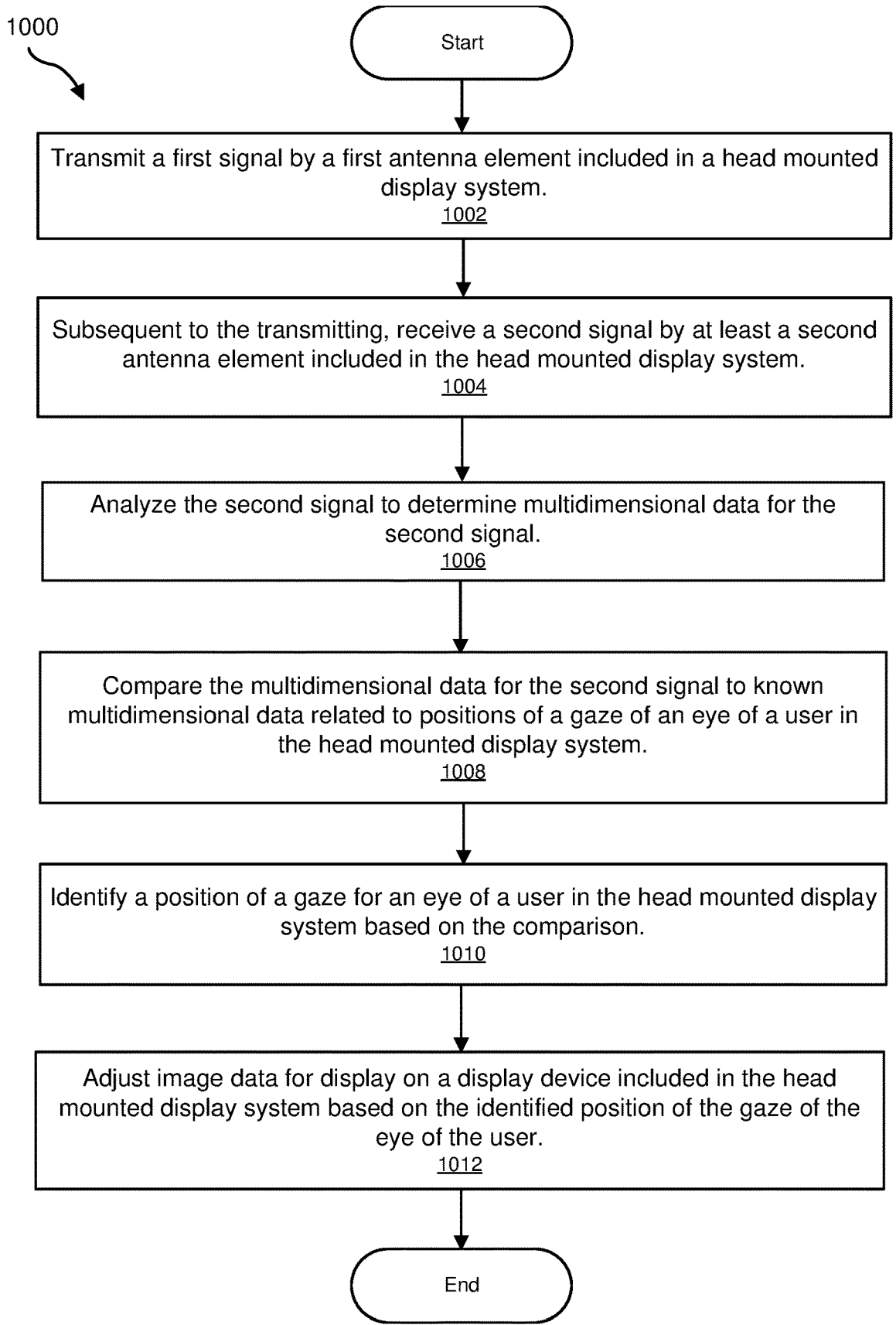
FIG. 10 is a flow diagram of an exemplary computer-implemented method for eye tracking in a head mounted display system.

FIG. 10 is a flow diagram of an exemplary computer-implemented method 1000 for eye tracking in a head mounted display system. The steps shown in FIG. 10 may be performed by any suitable computer-executable code and/or computing system, including the system(s) illustrated in FIG. 9. In one example, each of the steps shown in FIG. 10 may represent an algorithm whose structure includes and/or is represented by multiple sub-steps, examples of which will be provided in greater detail below.

As illustrated in FIG. 10, at step 1002 one or more of the systems described herein may transmit a first signal by a first antenna element included in a head mounted display system.

The systems described herein may perform step 1002 in a variety of ways. In one example, the millimeter wave generator module 822 may generate a first signal for use by the millimeter wave transmitter module 824. The antenna control module 806 may interface the millimeter wave transmitter module 824 with the antenna element 840a for transmission by the antenna element 840a.

As illustrated in FIG. 10, at step 1004 one or more of the systems described herein may subsequent to the transmitting, receive a second signal by at least a second antenna element included in the head mounted display system. For example, the antenna element 840b may receive the second signal.

The systems described herein may perform step 1004 in a variety of ways. In one example, the antenna element 840b may receive the second signal and provide the second signal to the backscatter receiver module 826.

As illustrated in FIG. 10, at step 1006 one or more of the systems described herein may analyze the second signal to determine multidimensional data for the second signal. For example, vector network analyzer module 804 may analyze the second signal to determine multidimensional data for the second signal.

The systems described herein may perform step 1006 in a variety of ways. In one example, the backscatter receiver module 826 may provide the second signal to the vector network analyzer 804 for analysis to determine the multidimensional data for the second signal.

As illustrated in FIG. 10, at step 1008 one or more of the systems described herein may compare the multidimensional data for the second signal to known multidimensional data related to positions of a gaze of an eye of a user in the head mounted display system. For example, the eye position tracking module 810 may compare the multidimensional data for the second signal to known multidimensional data.

The systems described herein may perform step 1008 in a variety of ways. In one example, the vector network analyzer module 804 may provide the multidimensional data for the second signal to the eye position tracking module 810. The eye position tracking module 810 may access the model device data storage 842 to obtain known multidimensional data related to positions of a gaze of an eye of a user in the head mounted display system for comparing to the multidimensional data for the second signal.

As illustrated in FIG. 10, at step 1010 one or more of the systems described herein may identify a position of a gaze for an eye of a user in the head mounted display system based on the comparison.

The systems described herein may perform step 1010 in a variety of ways. In one example, the eye position tracking module 810 may identify a position of a gaze for an eye of a user in the head mounted display system based on the comparison.

As illustrated in FIG. 10, at step 1012 one or more of the systems described herein may adjust image data for display on a display device included in the head mounted display system based on the identified position of the gaze of the eye of the user.

For example, the image adjustment module 908 may adjust image data for display on a display device included in the head mounted display system based on the identified position of the gaze of the eye of the user.

The systems described herein may perform step 1012 in a variety of ways. In one example, the image adjustment module 908 receives the identified position of a gaze for an eye of a user in the head mounted display system. Using the information, the image adjustment model adjusts image data for display on a display device in order to remove any distortion for the image.

Eye tracking in a head mounted display system (an HMD) may be accomplished using a backscatter method on millimeter waves (mmwaves) on a miniaturized antenna. Backscatter on mmwaves can be used for distance measurement. Due to different permeabilities of the human eye at different angles, the eye position angle can be estimated using backscatter on mmwaves. An antenna array may be a circular array of multiple miniaturized antenna elements placed around each lens in the HMD. The antenna arrays may be placed outside of the field of view of the user. The backscatter method may sequentially select one antenna element as a transmitter with the remaining antenna elements in the antenna array being receivers. Each antenna element may have an associated vector network analyzer. A vector network analyzer may generate the signal for transmitting at a selected frequency and may then measure a magnitude and phase of the return signals (multidimensional information) received from the receivers.

The return signals may be compared to and/or correlated with a status of an eye based on a predicate device. The data related to eye status based on multidimensional information can be trained data stored in a database, for example, in a look-up table (LUT). Using a backscatter method on mmwaves on a miniaturized antenna in an HMD can provide low power, fast, and accurate eye tracking in an HMD resulting in an improved experience for the user. Using the eye tracking information, the image as viewed by the user in the HMD may be processed and adjusted based on the position of the eyes of the user, eliminating chromatic aberrations that may distort the view of the image. The backscatter method on mmwaves on a miniaturized antenna can be used in an HMD as an alternative for electrooculography or other types of vision-based eye tracking that may involve complicated implementations that may negatively impact image latency and energy consumption of the HMD.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive multidimensional information, such as a magnitude and phase of a signal, may transform the multidimensional information for use in determining a position of an eye of a user, output a result of the transformation to an image adjustment module, use the result of the transformation to track an eye of a user, and, when training a system, store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   transmitting a first signal by a first antenna element of an antenna array comprising a circular array of antenna elements surrounding a lens, the antenna array and the lens included in an optical assembly of a head mounted display system;
   subsequent to the transmitting, receiving a respective signal for each antenna element included in a subset of the antenna elements, the subset of the antenna elements comprising all of the antenna elements included in the antenna array with the exception of the first antenna element;
   selecting a second signal of the received signals, the second signal being received by a second antenna element of the subset of the antenna elements;
   analyzing the second signal received by the second antenna element of the subset of antenna elements to determine multidimensional data for the second signal;
   comparing the multidimensional data for the second signal to known multidimensional data related to positions of a gaze of an eye of a user in the head mounted display system;
   identifying a position of a gaze for an eye of a user in the head mounted display system based on the comparison; and
   adjusting image data for display on a display device included in the head mounted display system based on the identified position of the gaze of the eye of the user.

2. The computer-implemented method of claim 1,
   wherein the first signal is a millimeter wave;
   wherein transmitting the first signal by the first antenna element comprises sequentially selecting an antenna element from the antenna array; and
   wherein receiving the respective signal for each antenna element included in the subset of the antenna elements comprises receiving backscatter waves from the eye of the user.

3. The computer-implemented method of claim 1, wherein the antenna array is outside of a field of view of the eye of the user.

4. The computer-implemented method of claim 1, wherein a first vector network analyzer is associated with the first antenna element and a second vector network analyzer is associated with the second antenna element.

5. The computer-implemented method of claim 4, wherein:
   the method further comprises generating, by the first vector network analyzer, a frequency for the first signal; and
   the first vector network analyzer transmits the first signal.

6. The computer-implemented method of claim 4, wherein the multidimensional data for the second signal includes a magnitude and phase of the second signal that is measured by the second vector network analyzer.

7. The computer-implemented method of claim 1, wherein the known multidimensional data related to positions of a gaze of an eye of a user in the head mounted display system are stored in a database.

8. The computer-implemented method of claim 7, wherein the known multidimensional data stored in the database is related to a known model of a standard head mounted display system.

9. The computer-implemented method of claim 1, wherein adjusting the image data for display on the display device includes modifying the image data to eliminate chromatic aberrations.

10. The computer-implemented method of claim 1, wherein the antenna array is separate from the lens.

11. A head mounted display system comprising:
    at least one physical processor;
    an optical assembly comprising:
      a lens; and
      an antenna array comprising a circular array of antenna elements surrounding the lens, the circular array of antenna elements comprising:
        a first antenna element; and
        a second antenna element;
    a display device; and
    physical memory comprising computer-executable instructions that, when executed by the physical processor, cause the head mounted display system to:
      transmit a first signal by the first antenna element;
      subsequent to the transmitting, receive a respective signal for each antenna element included in a subset of the antenna elements, the subset of the antenna elements comprising all of the antenna elements included in the antenna array with the exception of the first antenna element;
      select a second signal of the received signals, the second signal being received by the second antenna element of the subset of the antenna elements;
      analyze the second signal received by the second antenna element of the subset of antenna elements to determine multidimensional data for the second signal;
      compare the multidimensional data for the second signal to known multidimensional data related to positions of a gaze of an eye of a user in the head mounted display system;
      identify a position of a gaze for an eye of a user in the head mounted display system based on the comparison; and
      adjust image data for display on the display device based on the identified position of the gaze of the eye of the user.

12. The head mounted display system of claim 11,
    wherein the first signal is a millimeter wave;
    wherein the instructions that cause the head mounted display system to transmit the first signal by the first antenna element further include instructions that cause the head mounted display system to sequentially select an antenna element from the antenna array; and
    wherein the instructions that cause the head mounted display system to receive the respective signal for each antenna element included in the subset of the antenna elements further include instructions that cause the head mounted display system to receive backscatter waves from the eye of the user.

13. The head mounted display system of claim 11,
    wherein the head mounted display system further comprises:
      a first vector network analyzer associated with the first antenna element; and
      a second vector network analyzer associated with the second antenna element; and
    wherein the instructions, when executed by the physical processor, further cause the head mounted display system to:
      generate, by the first vector network analyzer, a frequency for the first signal for transmission by the first antenna element; and
      measure, by the second vector network analyzer, the multidimensional data for the second signal.

14. The head mounted display system of claim 11,
wherein the head mounted display system further comprises a database; and
wherein the known multidimensional data related to positions of a gaze of an eye of a user in the head mounted display system are stored in a look-up table in the database.

15. The head mounted display system of claim 11, wherein adjusting the image data for display on the display device includes modifying the image data to eliminate chromatic aberrations.

16. The head mounted display system of claim 11, wherein the antenna array is separate from the lens.

17. A non-transitory computer-readable medium comprising one or more computer-executable instructions that, when executed by at least one processor of a computing device, cause the computing device to:
transmit a first signal by a first antenna element of an antenna array comprising a circular array of antenna elements surrounding a lens, the antenna array and the lens included in an optical assembly of a head mounted display system;
subsequent to the transmitting, receive a respective signal for each antenna element included in a subset of the antenna elements, the subset of the antenna elements comprising all of the antenna elements included in the antenna array with the exception of the first antenna element;
select a second signal of the received signals, the second signal being received by a second antenna element of the subset of antenna elements;
analyze the second signal received by the second antenna element of the subset of the antenna elements to determine multidimensional data for the second signal;
compare the multidimensional data for the second signal to known multidimensional data related to positions of a gaze of an eye of a user in the head mounted display system;
identify a position of a gaze for an eye of a user in the head mounted display system based on the comparison; and
adjust image data for display on a display device included in the head mounted display system based on the identified position of the gaze of the eye of the user.

18. The non-transitory computer-readable medium of claim 17, wherein:
the first signal is a millimeter wave;
transmitting the first signal by the first antenna element comprises sequentially selecting an antenna element from the antenna array; and
receiving the respective signal for each antenna element included in the subset of the antenna elements comprises receiving backscatter waves from the eye of the user.

19. The non-transitory computer-readable medium of claim 17, wherein the antenna array is outside of a field of view of the eye of the user.

20. The non-transitory computer-readable medium of claim 17, wherein:
a first vector network analyzer is associated with the first antenna element;
a second vector network analyzer is associated with the second antenna element; and
the one or more computer-executable instructions further cause the computing device to:
generate, by the first vector network analyzer, a frequency for the first signal for transmission by the first antenna element; and
measure, by the second vector network analyzer, the multidimensional data for the second signal.

* * * * *